United States Patent
Mangold et al.

(10) Patent No.: US 6,839,846 B2
(45) Date of Patent: Jan. 4, 2005

(54) EMBEDDING DIGITAL SIGNATURES INTO DIGITAL PAYLOADS

(75) Inventors: Richard P. Mangold, Forest Grove, OR (US); Edward B. Shin, Hillsboro, OR (US); Mark Gross, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 09/753,870

(22) Filed: Jan. 3, 2001

(65) Prior Publication Data

US 2002/0087959 A1 Jul. 4, 2002

(51) Int. Cl.$^7$ .............................................. G06F 12/14
(52) U.S. Cl. ........................ 713/191; 713/170; 713/181
(58) Field of Search ................................. 713/176, 181, 713/187, 190, 191

(56) References Cited

U.S. PATENT DOCUMENTS 5,844,986 A    12/1998  Davis ............................ 380/4

FOREIGN PATENT DOCUMENTS

| EP | 1 043 656 A2 | 10/2000 | ............ G06F/9/44 |
| WO | WO 00/64178 A1 | 10/2000 | ............ H04N/7/24 |

*Primary Examiner*—Justin T. Darrow
(74) *Attorney, Agent, or Firm*—Trop, Pruner & Hu, P.C.

(57) ABSTRACT

A file may be transferred from one processor-based system to another. The file may include executable binary data together with an integrated digital signature. Each time a receiving processor-based system boots, the digital signature is automatically applied to the payload to ensure its authenticity. If the file is determined during the boot process to be corrupted, it may be automatically deleted and replaced with a predecessor file that may be maintained on the receiving system.

30 Claims, 3 Drawing Sheets

EMBEDDING DIGITAL SIGNATURES INTO DIGITAL PAYLOADS

BACKGROUND

This invention relates generally to the authentication of digital payloads transmitted from one processor-based system to another.

A digital signature is a personal authentication method based on encryption and a secret authorization code used for "signing" electronic documents. An electronic document, file or other electronic data in digital form including streaming data may be called a payload. When a payload is transmitted from one processor-based system to another, an issue may arise as to whether or not the payload is an authorized payload.

A number of instances may arise when a payload is unauthorized. In one case, an unauthorized third party may attempt to gain access to a receiving processor-based system for some improper purpose. In another case, the owner of a receiving processor-based system may attempt to use another processor-based system to access his own processor-based system to alter software on his own processor-based system for an improper purpose. Thus, it may be desirable to require the presence of a digital signature on any payload received in a given processor-based system.

One example of a system in which it may be desirable to require authentication of payloads is a network with a plurality of processor-based clients that receive update software from another processor-based system such as a server. The possibility exists that a software update received by a client may be unauthorized. For example, someone may be attempting to improperly gain access to the client by providing software which effectively opens up the client to access by a third party. Examples of situations where this may be problem include systems that implement television distribution, systems that provide access to resources on a restricted basis and systems that allow access to electronic files under limited circumstances. In each case, an access or charge control embedded into the client may be circumvented if an unauthorized party attempts to alter the software which enforces the control on the client.

Still another situation in which it may be desirable to control the way the client operates is in connection with so-called MP3 players. MP3 players play digital files in accordance with the MPEG-1, layer 3 standard (Moving Pictures Experts Group-1 (MPEG-1) available from the International Organization of Standardization, ISO/IEC 11172-3 and ISO/IEC 13818-3 (1993)). In some applications, it may be desirable to restrict users' ability to download electronic files without charge. For example, it may be desirable to require users to pay a fee in order to access music over the Internet. This pay-per-download policy may be enforced by software within the MP3 player itself. Thus, one may attempt to circumvent such software by providing software updates to the MP3 player that are unauthorized.

Digital signature software may involve the use of public key algorithms. An electronic document may be encrypted using a private key to create a secure digital signature. In other cases, a separate algorithm is used for digital signatures that can not be used for encryption. A user encrypts a document with a private key thereby signing the document. The document is then sent to another processor-based system where it is decrypted with a public key provided by the user thereby verifying the signature. Thus, the key for decryption is obtained separately from the signed document.

Once a payload has been verified, it may then be used with impunity within the receiving processor-based system. In a variety of circumstances, it may be desirable to ensure that the payload that was uncorrupted as received is uncorrupted at all times thereafter.

Thus, there is a need for better ways to provide digital signatures in connection with payloads.

DETAILED DESCRIPTION

Figure 1:
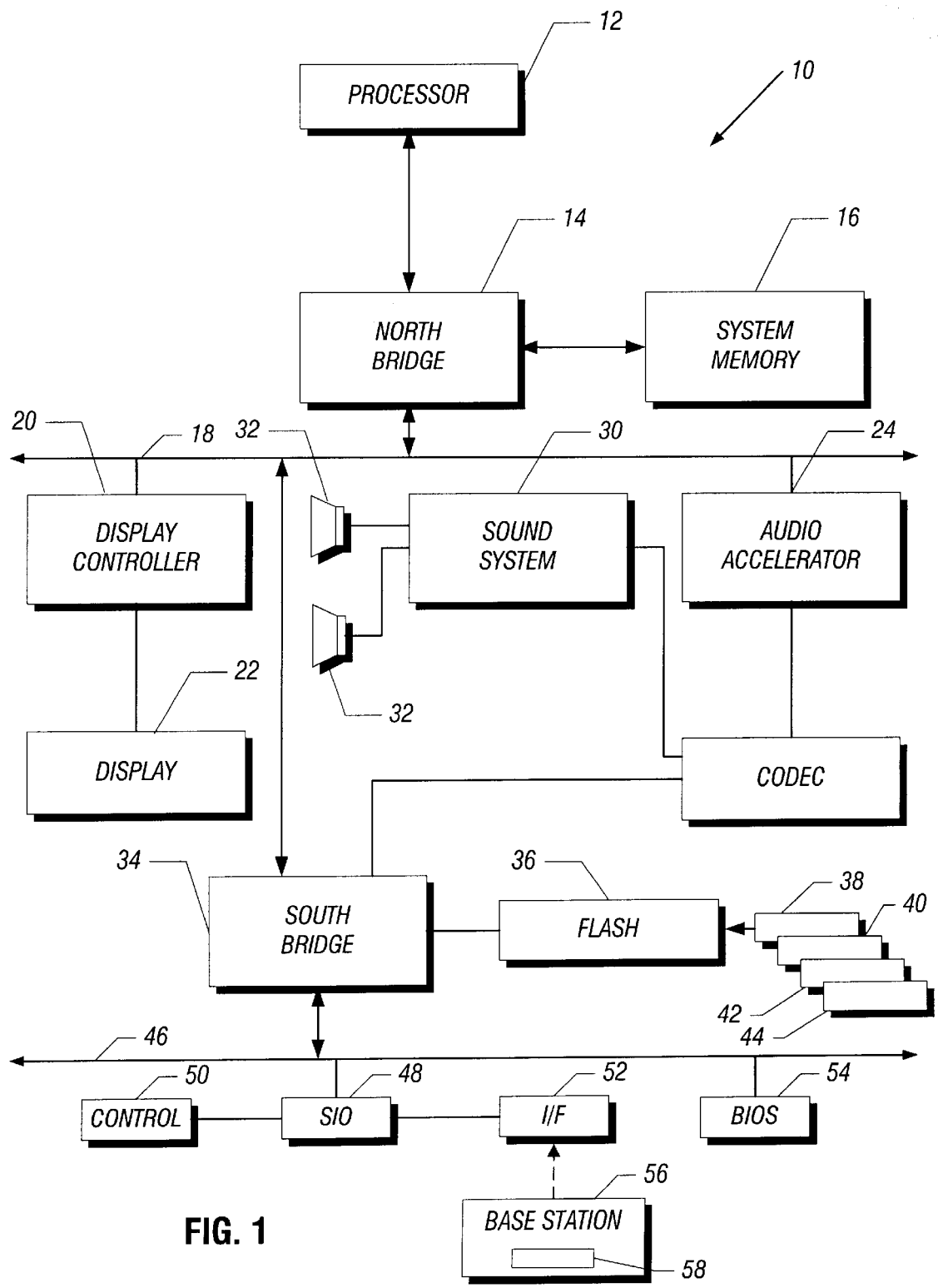
FIG. 1 is a block depiction of one embodiment of the present invention.

A receiving processor-based system 10 may receive a payload from a sending processor-based system 56 as shown in FIG. 1. The receiving 10 and sending 56 processor-based systems may be part of hierarchical or peer-to-peer networks. In one embodiment, the sending system 56 may be a server and the receiving system 10 may be a client. The systems 10 and 56 may be coupled by a hardwired connection, a network connection, such as a Local Area Network (LAN) or an Internet connection, a telephone connection, or a wireless connection, as a few examples.

The sending system 56 provides a signed payload to the receiving system 10. The payload may be an electronic document for use by the receiving system 10. As one example, the sending system 56 may provide signed software updates for the receiving system 10.

In some embodiments of the present invention, it is important to ensure that the payload provided to the receiving system 10 is authentic and remains uncorrupted throughout its useful life on the receiving system 10.

In one embodiment of the present invention, the receiving system 10 is an MP3 player. That is, it is a portable device that is capable of receiving and playing digital music files in the form of MP3 files. However, the present invention is applicable to a wide variety of processor-based system applications and is in no way limited to an MP3 player.

The system 10 may include a processor 12 coupled to a north bridge 14 in one embodiment. The north bridge 14 couples a bus 18 and system memory 16, in one embodiment. In that embodiment, the bus 18 may be coupled to a display controller 20 which couples to a display 22. In an MP3 player application, the display 22 may be a small liquid crystal display as one example.

In one embodiment, the bus 18 may also couple to an audio accelerator 24 and a coder/decoder or codec 26. The codec 26 may drive a sound system 30 which may be coupled to internal or external speakers 32. In the case of an MP3 player, external speakers 32 may be coupled to the system 10.

The codec 26 and the bus 18 may be coupled to a south bridge 34 in one embodiment. In that embodiment, a flash memory 36 may be utilized. However, other forms of storage including hard disk drives may be more applicable in other applications. In the illustrated embodiment, the flash memory 36 stores software 38, music files 40, a software system 42, and a backup software system 44 as one example.

The south bridge 34 is coupled to a bus 46 in one embodiment. In that embodiment, the bus 46 may be coupled to a serial input/output (SIO) device 48 which in turn couples to controls 50 and an interface 52. The controls 50 may receive user inputs. The interface 52 provides for a connection to a remote, sending processor-based system 56 which in one embodiment may be a base station. The connection between the interface 52 and the system 56 may be a network connection, a hardwired connected, a Universal Serial Bus connection, or a wireless connection, to mention a few examples.

A payload may be received from the system 56 through the interface 52. The system 56 may store software in a storage 58. Conventionally, the system 56 is a processor-based system.

Also coupled to the bus 46 is a basic input/output system (BIOS) storage 54. A variety of other components may be included and other architectures may be used in a variety of different embodiments.

Figure 2:
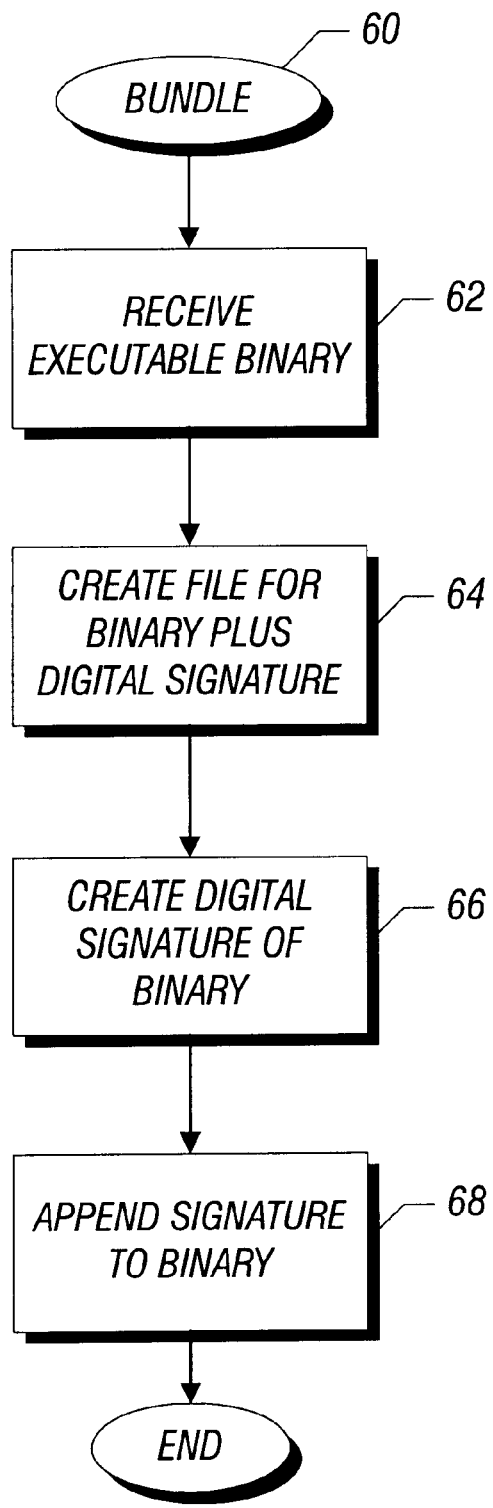
FIG. 2 is a flow chart for software to bundle a payload with a digital signature in accordance with one embodiment of the present invention.
Figure 3:
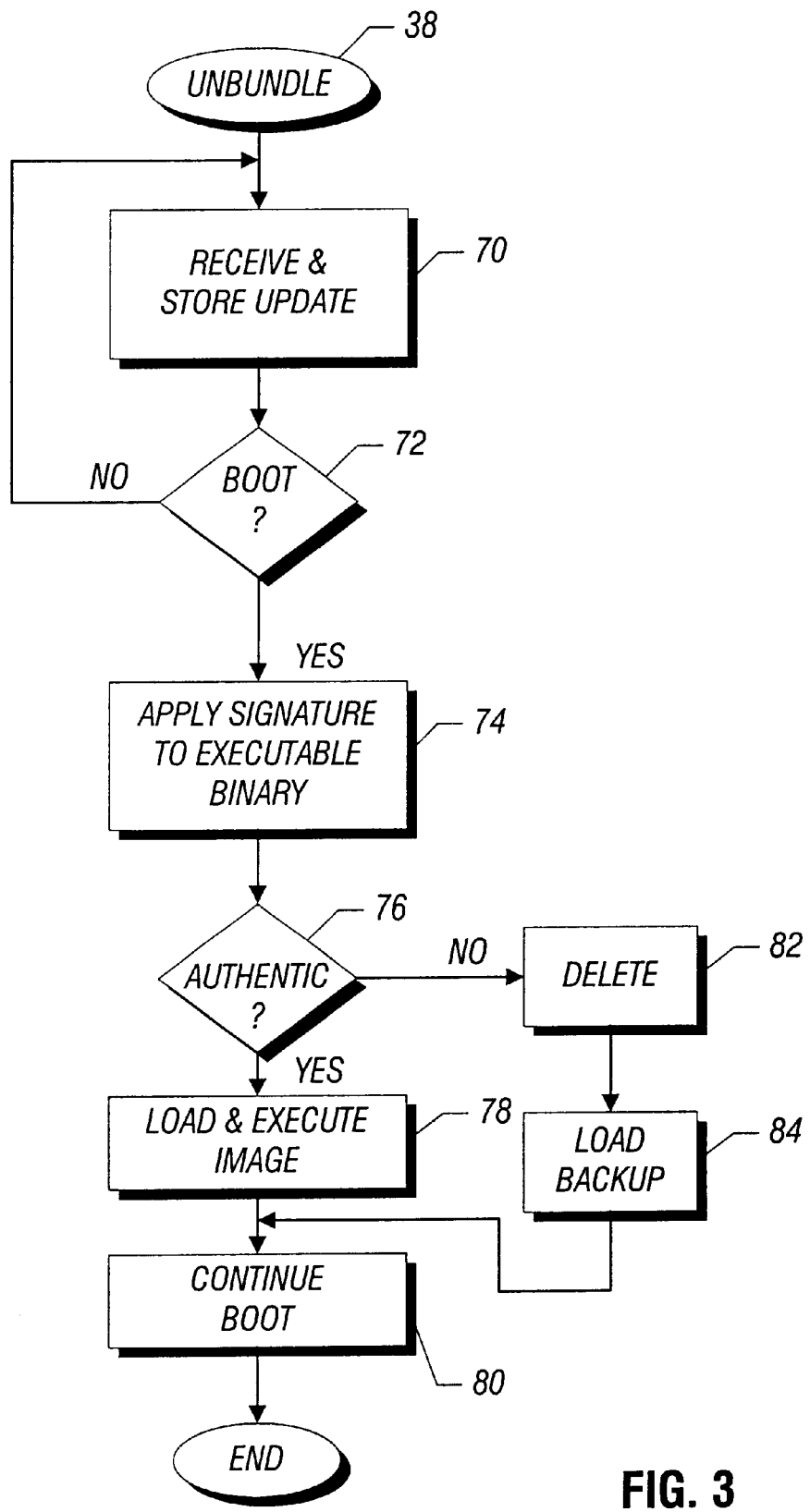
FIG. 3 is a flow chart for software which may be utilized to apply a digital signature to a payload in accordance with one embodiment of the present invention.

Turning next to FIG. 2, the software 60 may be stored on the storage 58 of the sending processor-based system 56 which may function as a base station in some embodiments. The software 60 may be responsible for creating a digital file including a payload with a digital signature. In this way, the payload and the digital signature may be integrated so that each time the payload is utilized, it may be automatically authenticated using the integrated digital signature in one embodiment.

The software 60 initially receives executable binary data as indicated in block 62. As one example, the executable binary data may be a software update for the processor-based system 10. The system 56 creates a file for the executable binary data together with a digital signature as indicated in block 64. Each file is created of a size equal to the size of the executable binary data together with the expected digital signature size. The file size may be rounded up to a particular number of bytes in some embodiments.

A digital signature is then created for the executable binary data. The digital signature is created for the data in the file minus the bits where the digital signature will go once completed. Any technique may be utilized for creating the digital signature including the use of a public key or private key for encryption. Alternatively, a separate algorithm may be utilized for creating the digital signature and encrypting the underlying data.

The digital signature is appended to the executable binary data as indicated in block 68 within the previously created file of the appropriate size. At an appropriate time, the composite file including an integrated digital signature and executable binary data may be transferred from the system 56 to the system 10.

In the system 10, the signed file may be unbundled using software 38. The file may be received over an appropriate communication link, which may use a wired or wireless connection, through an interface 52 as one example. The interface 52 may be a network interface card, a modem, a wireless interface, or a Universal Serial Bus hub, to mention a few examples.

In the system 10, the software 38 receives and stores the signed digital file including a payload and a digital signature as indicated in block 70. The next time the system 10 boots, as determined at diamond 72, the signature is automatically applied to the executable binary data as indicated in block 74. In other words, every time it is desired to use the payload or executable binary data, the digital signature is applied. This means that if for any reason the payload becomes corrupted, even if uncorrupted as received, this corruption is detected in the course of the boot up process.

If in a given boot operation, the digital signature when hashed with the executable binary data indicates authenticity as determined in diamond 76, an image may be formed by executing the executable binary data as indicated in block 78. Thus, as one example, a software update may be loaded repeatedly each time the system 10 boots so long as the payload is repeatedly determined to be authentic using the digital signature. Thereafter, the boot process continues as indicated in block 80.

If for some reason the payload is determined to be corrupted at diamond 76, the payload is immediately deleted as indicated in block 82 in one embodiment. In one embodiment of the present invention, the new payload never replaces the existing software. Instead, each time the system boots, the signature on the payload is checked and if uncorrupted the new payload runs in place of the existing software. If authenticity is denied, the new payload is automatically deleted, as indicated in block 82. In such case, the existing software is automatically loaded as indicated in block 84 and the boot process continues per block 80.

If both the payload and the existing software are corrupted, the system 10, in one embodiment, may enter a wait state. In such case, the system 10 merely waits for replacement software without booting.

In one embodiment of the present invention, the key for the digital signature is applied to the entire executable binary which amounts to the entire image of the payload or update software.

In an application involving an MP3 player, the payload may be checked upon each boot sequence. This reduces the likelihood that software may become corrupted at any time, enabling a user to obtain files, such as digital music files, and to use those files without undergoing the appropriate procedures. In some cases, those procedures may include assessing a charge for the downloading of music files.

In some embodiments, by binding the signature to the signed data, the fielding and application of digital signature technologies may be simplified. Since the digital signature is bound to the payload the signature is intended to authenticate, a secure run time loader is created. If any non-authentic bits are identified, the signed image may be automatically deleted in one embodiment. The system is secure because it verifies the signed data on every boot up in one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a file including a payload and a digital signature for the payload at a processor-based system; and
   automatically applying the digital signature to the payload when the processor-based system boots.

2. The method of claim 1 wherein receiving a file includes receiving a file in a first processor-based system sent by a second processor-based system.

3. The method of claim 1 wherein receiving a file includes receiving a software update.

4. The method of claim 3 wherein receiving a software update includes receiving a software update for a prior software version and preserving the prior software version.

5. The method of claim 2 wherein applying the digital signature includes applying the digital signature to the payload each time the first processor-based system is booted.

6. The method of claim 1 further including determining whether the payload is authentic.

7. The method of claim 6 wherein if the payload is authentic, booting the system.

8. The method of claim 6 wherein if the payload is not authentic, deleting the payload.

9. The method of claim 8 including loading a backup in place of the payload.

10. The method of claim 1 wherein receiving a file includes receiving a payload in the form of executable binary data and applying the digital signature to the executable binary data.

11. An article comprising a medium storing instructions that enable a processor-based system to:

receive a file including a payload and a digital signature for the payload at a processor-based system; and automatically apply the digital signature to the payload when the processor-based system boots.

12. The article of claim 11 further storing instructions that enable a first processor-based system to receive a file sent by a second processor-based system.

13. The article of claim 11 further storing instructions that enable a processor-based system to receive a software update.

14. The article of claim 13 further storing instructions that enable the processor-based system to receive a software update for a prior software version and preserve the prior software version.

15. The article of claim 12 further storing instructions that enable a first processor-based system to apply the digital signature to the payload each time the first processor-based system is booted.

16. The article of claim 11 further storing instructions that enable the processor-based system to determine whether the payload is authentic.

17. The article of claim 16 further storing instructions that enable the processor-based system to boot if the payload is authentic.

18. The article of claim 16 further storing instructions that enable the system to delete the payload if the payload is not authentic.

19. The article of claim 18 further storing instructions that enable the processor-based system to load a backup in place of the payload.

20. The article of claim 11 further storing instructions that enable the processor-based system to receive a payload in the form of executable binary data and apply the digital signature to the executable binary data.

21. A system comprising:

a processor; and a storage coupled to said processor storing instructions that enable the system to receive a file including a payload and a digital signature for the payload at said system and automatically apply the digital signature to the payload when said system boots.

22. The system of claim 21 wherein said system is an MP3 player.

23. The system of claim 21 wherein said system is coupled to receive the file from a second processor-based system.

24. The system of claim 21 wherein said storage stores instructions for receiving a software update.

25. The system of claim 24 wherein said storage stores instructions that enable the system to receive a software update for a prior software version and preserve the prior software version.

26. The system of claim 23 wherein said storage stores instructions that enable the system to apply the digital signature to the payload each time the system is booted.

27. The system of claim 21 wherein said storage stores instructions to automatically determine if the payload is authentic.

28. The system of claim 27 wherein said storage stores instructions that enable the system to boot only if the payload is authentic.

29. The system of claim 27 wherein said storage stores instructions that enable the payload to be automatically deleted if the payload is not authentic.

30. The system of claim 29 wherein said storage stores instructions to automatically load a backup in place of the payload when the payload is deleted.

* * * * *